Nov. 12, 1940.    G. D. REINHARDT    2,221,423
REFRIGERATING APPARATUS
Filed April 11, 1938    2 Sheets-Sheet 1

Inventor
George D. Reinhardt
By Jack A. Ashley
Attorney

Nov. 12, 1940. G. D. REINHARDT 2,221,423
REFRIGERATING APPARATUS
Filed April 11, 1933   2 Sheets-Sheet 2

Inventor
George D. Reinhardt.
By Jack A. Ashley
Attorney

Patented Nov. 12, 1940

2,221,423

UNITED STATES PATENT OFFICE 2,221,423

REFRIGERATING APPARATUS

George D. Reinhardt, San Antonio, Tex.

Application April 11, 1938, Serial No. 201,248

7 Claims. (Cl. 62—141)

This invention relates to new and useful improvements in refrigerating apparatus, which is generally known as an ice accumulator.

One object of the invention is to provide an improved refrigerating apparatus which is simple in construction and inexpensive in operation and which is particularly adapted for use in places where refrigeration is needed only at intervals, such as church auditoriums, assembly halls, mortuaries and the like.

An important object of the invention is to provide an improved ice accumulator wherein ice is formed and accumulated within cooling compartments and wherein the water, or other liquid, to be cooled, is circulated through the cooling compartments; there being positive means for effecting a uniform and progressive cooling of the water as it flows through the compartments in contact with the accumulated ice, whereby a uniform temperature at all levels of the water in each compartment is maintained.

A particular object of the invention is to provide an improved refrigerating apparatus having a plurality of compartments through which the water to be cooled is circulated and having means between each compartment for transposing the water flowing from one compartment to the next, whereby the water in the lower stratum in one compartment is directed into the upper stratum of the succeeding compartment, while the water in the upper stratum of the first compartment is directed to the lower stratum of the succeeding compartment; such transposition of the water, as it flows from one compartment into the next succeeding compartment, producing a uniform temperature of water at all levels in each compartment, whereby the flowing water is prevented from channeling through the compartment.

Still another object of the invention is to provide an improved transposition unit for refrigerating apparatus which includes a casing divided into two sections, one of which has an inlet at its top with an outlet at its bottom while the other has an inlet at its bottom and an outlet at its top, whereby water flowing through the casing is transposed and thoroughly admixed.

A construction designed to carry out the invention will be hereinafter described, together with other features of the invention.

Figure 1:
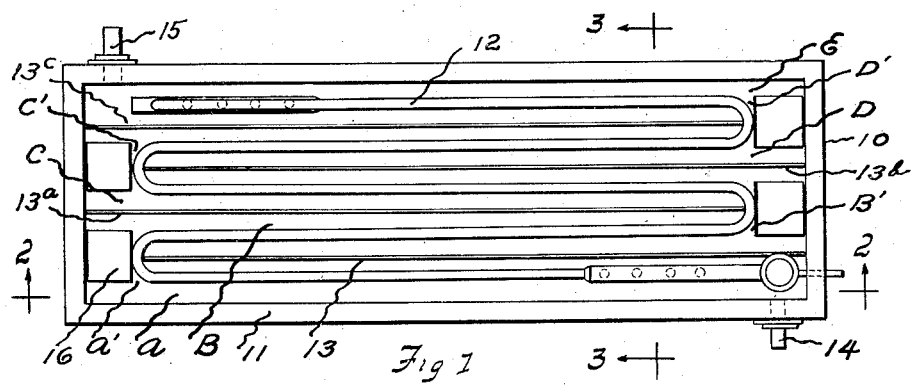
Figure 2:
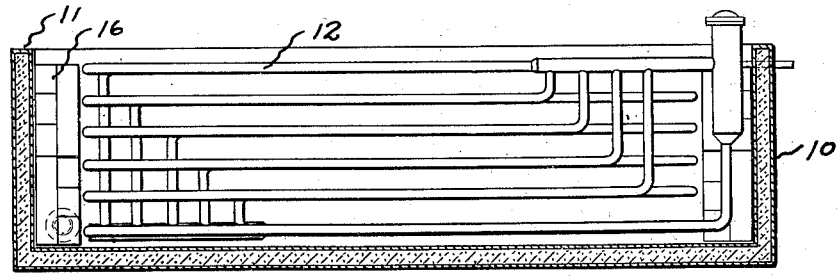
Figure 3:
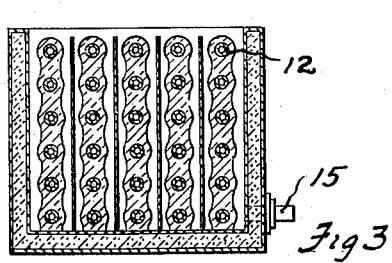
Figure 4:
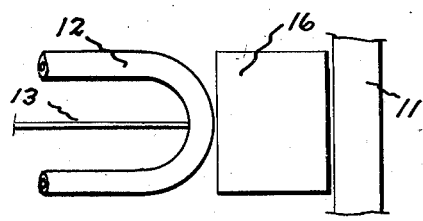
Figure 5:
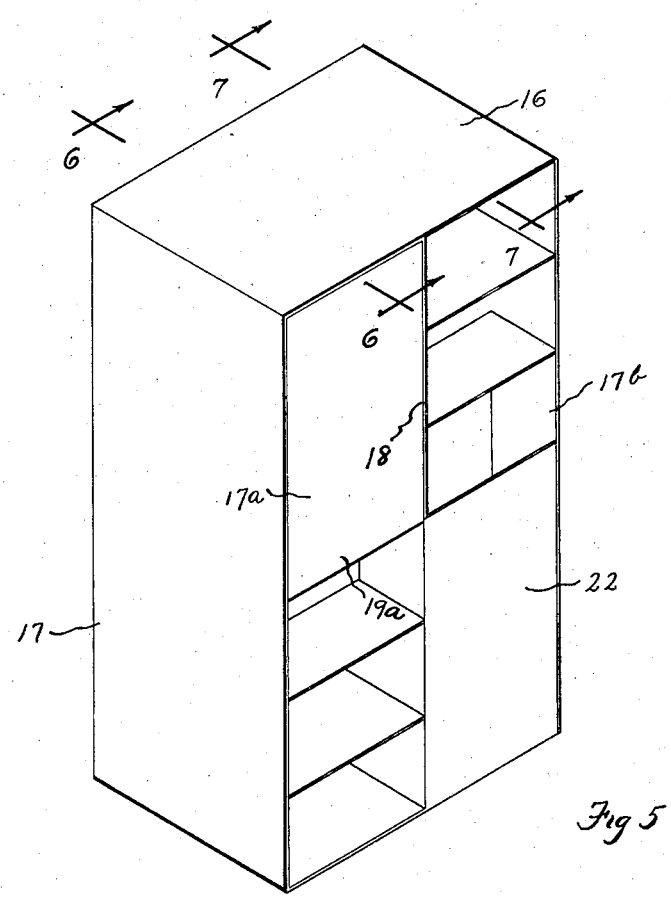
Figures 6, 7:
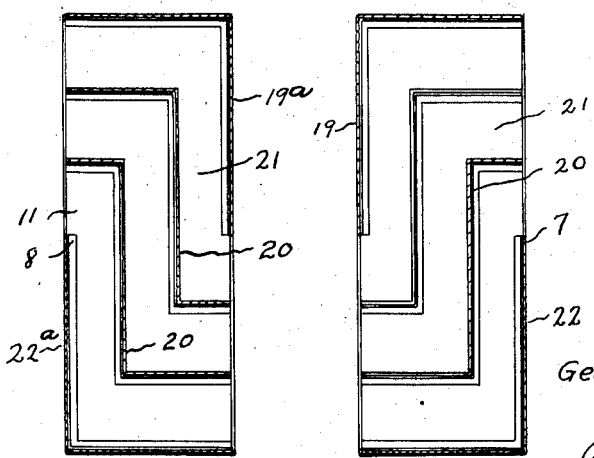

The invention will be more readily understood from a reading of the following specification and by reference to the accompanying drawings, in which an example of the invention is shown, and wherein:

Figure 1 is a plan view of a refrigerating apparatus, constructed in accordance with the invention, having its top removed, Figure 2 is a longitudinal, sectional view, taken on the line 2—2 of Figure 1, Figure 3 is a transverse, vertical, sectional view, taken on the line 3—3 of Figure 1, Figure 4 is an enlarged plan view of one of the transposition units in position within the cooling chamber, Figure 5 is an isometric view of one of the transposition units, Figure 6 is a transverse, vertical, sectional view, taken on the line 6—6 of Figure 5, and Figure 7 is a transverse, vertical, sectional view, taken on the line 7—7 of Figure 5.

In the drawings, the numeral 10 designates a tank or housing which is substantially rectangular in cross-section. The walls of the tank are preferably insulated, while the upper end thereof is closed by a suitable top 11. The interior of the tank forms a cooling chamber and cooling coils 12 are disposed in said chamber. The coils extend longitudinally within the chamber, as clearly shown in Figure 1, and form a closed refrigerating system through which a suitable refrigerant is circulated by means of a compressor (not shown). A plurality of partitions 13, 13a, 13b and 13c extend longitudinally through the cooling chamber and divide said chamber into longitudinal compartments A, B, C, D and E. Communication between the compartments is established by terminating the partitions short of the end wall of the tank, for example, one end of partition 13 is spaced from the end wall to provide an opening A' between the compartments A and B. The opposite end of the next partition 13a is spaced from the opposite end wall of the tank to form an opening B' which establishes communication between the compartments B and C. Similar openings C' and D' are provided at the ends of the partitions 13b and 13c and by observing Figure 1, it will be seen that the openings A' to D' are staggered or alternately located at opposite ends of the successive compartments, whereby water introduced, through the inlet pipe 14, into the compartment A must flow longitudinally through each compartment A, B, C, D and E to reach the outlet 15.

Within each of the openings A', B', C' and D', a transposition unit 16 is mounted and the water in one compartment must flow through this unit to reach the next succeeding compartment. The unit is clearly shown in Figures 5 to 7 and comprises a casing 17 having its top, bottom and sides closed. The casing is substantially of the same height as the tank 10 and is located centrally of each partition within the opening (Figure 4). The ends of the compartment are open so that the water may flow therethrough.

A central, vertical partition 18 divides the casing into two sections 17a and 17b. The sections 17a has the upper half of its influent end closed by a closure panel 19a, whereby water can enter this section only through the lower half of its influent end. A pair of angular deflecting plates or flumes 20 extend transversely within the section 17a and as is clearly shown in Figure 6, each plate has one end terminating at the inlet end of the section below the panel 19a. The plate is then bent upwardly so as to extend vertically, after which it is bent outwardly so as to terminate at the outlet end of the section 17a. The angular plates or flumes form angular channels 21 within the section 17a which channels extend from the lower end of the section to the upper end thereof. The lower half of the outlet end of the section is closed by a closure panel 22a. With this arrangement, the water entering the section 17a must enter the lower portion thereof, after which it is directed upwardly therethrough and then escapes from the upper portion thereof.

The section 17b is constructed in the same manner as the section 17a except that the lower half of its inlet end is closed by a panel 22, whereby the water must enter the upper half thereof (Fig. 7). The angular flumes 20 extend from the upper portion of the inlet end of the section to the lower end portion of the outlet end. A panel 19 closes the upper half of the outlet end of the section 17b and thus, water enters the upper portion of this section, and is directed downwardly therethrough and escapes from the lower end thereof.

From the foregoing, it will be manifest that when water flows through the transposition unit, the upper stratum of water enters the section 17b, while the lower stratum of water enters the section 17a. The water flowing through the section 17b flows downwardly, while the water flowing through the section 17a is directed upwardly, whereby as the water is admixed so that that which was on top is on the bottom, and vice versa, after passing through the unit. As explained, one of the units 16 is located in each opening between the compartments of the cooling chamber and, therefore, as the water flows from one chamber to the next, it is transposed, or admixed, so as to maintain a uniform temperature of the water in each compartment.

In operation, the tank is filled with water and said water is not circulated, but remains quiescent. The compressor (not shown) is started so as to circulate the refrigerant through the coils 12, whereby the quiescent water contacting the coils is cooled. This water, in close proximity to the coils, eventually congeals to ice and the ice accumulation soon fills the space between the superposed coils, as shown in Figure 3, whereby solid walls of ice are formed within the tank. When this occurs, the unfrozen water remaining in the tank is circulated through the compartments A, B, C, D and E, by means of a pump (not shown) which is located exteriorly of the tank 10. From the outlet line, the water is conducted to the parts to be refrigerated.

The water circulating through the compartments of the tank contacts and flows along the ice walls and is thereby cooled. As the water flows from one compartment to the next, it passes through one of the transposition units 16 and is thus transposed and admixed. The water is thus maintained at a uniform temperature throughout and will act with uniform effect upon the ice, with the result that the ice wall is uniformly melted. This prevents channeling of the water and insures highest efficiency of the apparatus.

After prolonged operation, the ice will be melted and reduced to cold water which may be used for refrigerating purposes. The compressor (not shown) may continue to operate, if desired, while the water is circulated, in which case the rate of meltage of the ice is reduced and the period of refrigeration may thus be prolonged. The device is particularly adaptable for use in buildings or places where refrigeration is only needed at intervals, as for example, churches. The original cost or investment is slight and the operating expense is low. When used in a church, the refrigerant may be circulated for a day or two before use so as to freeze sufficient ice for the purpose. By the time the ice has melted, the building is sufficiently cooled so that the relatively small refrigerating unit may carry the load. The transposition units are important in that they maintain uniform temperature throughout the body of water in each compartment so that the temperature of the water is gradually and progressively lowered as it flows through the compartments, which results in the highest possible efficiency.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A refrigerating apparatus including, a cooling chamber for receiving water to be cooled and divided into a plurality of compartments which communicate with each other, means within the compartments for freezing a portion of the water therein to form ice, means for circulating the unfrozen water successively through the compartments, whereby the flowing water contacts the ice and is cooled thereby, and a transposition unit mounted between the successive compartments whereby the water flowing from one compartment to the succeeding compartment must flow therethrough, said unit having means for transposing the water so that the water which is at the top of one compartment is directed to the bottom of the next succeeding compartment and the water at the bottom of said first compartment is directed to the top of the succeeding compartment, which results in a mixing of the water so the temperature throughout the entire body is maintained uniform during its flow through the chamber.

2. A refrigerating apparatus including, a cooling chamber for receiving water to be cooled and divided into a plurality of compartments which communicate with each other, means within the compartments for freezing a portion of the water therein to form ice, means for circulating the unfrozen water successively through the compartments, whereby the flowing water contacts the ice and is cooled thereby, a casing mounted between the successive compartments so that the water flowing from one compartment to the succeeding compartment must pass through the casing, and angular channels within the casing for transposing the strata of the body of water as the water flows therethrough.

3. A refrigerating apparatus including, a cooling chamber for receiving fluids to be cooled and divided into a plurality of compartments which communicate with each other, means within the compartments for cooling the fluids, means for circulating the fluids successively through the compartments, and a transposition unit mounted between the successive compartments whereby the fluid flowing from one compartment to the succeeding compartment must flow therethrough, said unit having means for transposing the fluid so that the fluid which is at the top of one compartment is directed to the bottom of the next succeeding compartment and the fluid at the bottom of said first compartment is directed to the top of the succeeding compartment, which results in a mixing of the fluid so the temperature throughout the entire body is maintained uniform during its flow through the chamber.

4. A refrigerating apparatus including, a cooling chamber for receiving fluids to be cooled and divided into a plurality of compartments which communicate with each other, means within the compartments for cooling the fluids, means for circulating the fluids successively through the compartments, a casing mounting between the successive compartments so that the fluid flowing from one compartment to the succeeding compartment must pass through the casing, and angular channels within the casing for transposing the strata of the body of fluids as the fluid flows therethrough.

5. A refrigerating apparatus including, a cooling chamber for receiving fluids to be cooled and divided into a plurality of compartments which communicate with each other, means within the compartments for cooling the fluids, means for circulating the fluids successively through the compartments, a casing mounted between the successive compartments so that the fluid flowing from one compartment to the succeeding compartment must pass through the casing, and means within the casing for transposing the strata of the body of fluid as the fluid flows therethrough.

6. A refrigerating apparatus including, a cooling chamber for receiving fluids to be cooled and divided into a plurality of compartments which communicate with each other, means within the compartments for freezing a portion of the fluid therein to form ice, means for circulating the unfrozen fluid successively through the compartments, whereby the flowing fluid contacts the ice and is cooled thereby, a transposition unit mounted between the successive compartments whereby the fluid flowing from one compartment to the succeeding compartment must flow therethrough, said unit being divided into two sections, one section having an inlet at its upper portion while the other section has an inlet at its lower portion, means for directing the flow entering the inlet in the first section downwardly through the unit and permitting its escape from the lower portion of said section on the end opposite the inlet, and means for directing the flow entering the inlet of the second section upwardly through the unit and permitting its escape from the upper portion of the section on the end opposite the inlet, whereby when a body of fluid is introduced into the unit through the inlet its strata are transposed as it flows through the unit.

7. A refrigerating apparatus including, a cooling chamber for receiving fluids to be cooled and divided into a plurality of compartments which communicate with each other, means within the compartments for freezing a portion of the fluid therein to form ice, means for circulating the unfrozen fluid successively through the compartments, whereby the flowing fluid contacts the ice and is cooled thereby, a transposition unit mounted between the successive compartments whereby the fluid flowing from one compartment to the succeeding compartment must flow therethrough, said unit being divided into two sections, one section having an inlet at its upper portion while the other section has an inlet at its lower portion, transverse angular members forming channels within the section for directing the flow entering the inlet in the first section downwardly through the unit and permitting its escape from the lower portion of said section on the end opposite the inlet, and transverse angular members forming channels within the section for directing the flow entering the inlet of the second section upwardly through the unit and permitting its escape from the upper portion of the section on the end opposite the inlet, whereby when a body of fluid is introduced into the unit through the inlet its strata are transposed as it flows through the unit.

GEORGE D. REINHARDT.